US010566850B2

(12) United States Patent
Percebon (10) Patent No.: US 10,566,850 B2
(45) Date of Patent: Feb. 18, 2020

(54) APPARATUS AND METHODS FOR REDUCING MAGNETIC FIELD EMISSIONS BETWEEN WIRELESS POWER TRANSMITTERS

(71) Applicant: WiTricity Corporation, Watertown, MA (US)

(72) Inventor: Leandro Percebon, Munich (DE)

(73) Assignee: WiTricity Corporation, Watertown, MA (US)

( * ) Notice: Subject to any disclaimer, the term of this patent is extended or adjusted under 35 U.S.C. 154(b) by 486 days.

(21) Appl. No.: 15/179,854

(22) Filed: Jun. 10, 2016

(65) Prior Publication Data

US 2017/0358960 A1    Dec. 14, 2017

(51) Int. Cl.
*H02J 50/80* (2016.01)
*H02J 50/70* (2016.01)
(Continued)

(52) U.S. Cl.
CPC .............. *H02J 50/80* (2016.02); *B60L 53/12* (2019.02); *H02J 7/025* (2013.01); *H02J 50/12* (2016.02); *H02J 50/40* (2016.02); *H02J 50/70* (2016.02); *H02J 50/90* (2016.02); *B60L 2270/147* (2013.01); *H02J 7/0027* (2013.01); *Y02T 10/7005* (2013.01); *Y02T 10/7055* (2013.01);
(Continued)

(58) Field of Classification Search
None
See application file for complete search history.

(56) References Cited

U.S. PATENT DOCUMENTS 6,037,750 A * 3/2000 Von Novak ............ H02J 7/0011
320/128
9,819,228 B2 * 11/2017 Von Novak ............. H02J 17/00
(Continued)

FOREIGN PATENT DOCUMENTS

WO    WO-2016039644 A2    3/2016

OTHER PUBLICATIONS

International Search Report and Written Opinion—PCT/US2017/032663—ISA/EPO—dated Oct. 30, 2017.
(Continued)

*Primary Examiner* — Jared Fureman
*Assistant Examiner* — James P Evans
(74) *Attorney, Agent, or Firm* — Knobbe, Martens, Olson & Bear, LLP (57) ABSTRACT

In an aspect of the disclosure, an apparatus for wirelessly transmitting power is provided. The apparatus includes a communication circuit configured to communicate with a first wireless power transmitter and a second wireless power transmitter. The apparatus further includes a controller circuit configured to identify a first phase of a first current provided to the first wireless power transmitter, the first current generating a first magnetic field. The controller circuit further determines a time to provide a second current to the second wireless power transmitter. The controller circuit further provides the second current at the determined time with a second phase having a phase difference between the first phase configured to reduce a magnitude of a combined magnetic field of the first and second magnetic fields in a region between the first and second wireless power transmitters.

30 Claims, 6 Drawing Sheets

(51) Int. Cl.
  *H02J 50/40* (2016.01)
  *H02J 7/02* (2016.01)
  *H02J 7/00* (2006.01)
  *H02J 50/90* (2016.01)
  *B60L 53/12* (2019.01)
  *H02J 50/12* (2016.01)

(52) U.S. Cl.
  CPC .......... *Y02T 10/7072* (2013.01); *Y02T 90/122* (2013.01); *Y02T 90/14* (2013.01); *Y02T 90/16* (2013.01)

(56) References Cited

U.S. PATENT DOCUMENTS

| | | | |
|---|---|---|---|
| 10,033,226 B2 * | 7/2018 | White, II | H01F 38/14 |
| 2007/0259714 A1 * | 11/2007 | Block | G06F 21/629 463/29 |
| 2010/0328044 A1 * | 12/2010 | Waffenschmidt | H02J 7/025 340/10.4 |
| 2011/0285349 A1 * | 11/2011 | Widmer | B60L 11/182 320/108 |
| 2012/0262002 A1 * | 10/2012 | Widmer | B60L 53/65 307/104 |
| 2014/0125140 A1 * | 5/2014 | Widmer | H02J 7/025 307/104 |
| 2014/0203769 A1 * | 7/2014 | Keeling | H01F 38/14 320/108 |
| 2014/0246916 A1 * | 9/2014 | Von Novak | H02J 17/00 307/104 |
| 2014/0266018 A1 * | 9/2014 | Carobolante | H02J 7/025 320/108 |
| 2014/0349573 A1 * | 11/2014 | Moes | H02J 7/025 455/41.1 |
| 2015/0115727 A1 * | 4/2015 | Carobolante | H02J 5/005 307/104 |
| 2015/0123486 A1 | 5/2015 | Abe et al. | |
| 2015/0145339 A1 | 5/2015 | Chiyo et al. | |
| 2015/0197155 A1 * | 7/2015 | Lu | B60L 11/182 320/108 |
| 2015/0236513 A1 * | 8/2015 | Covic | H02J 7/025 307/104 |
| 2015/0246614 A1 * | 9/2015 | Dames | B60L 5/005 191/10 |
| 2015/0336463 A1 * | 11/2015 | Boyer | H04B 5/0037 320/108 |
| 2016/0294216 A1 * | 10/2016 | Barbul | B60L 11/182 |
| 2016/0315383 A1 * | 10/2016 | Akuzawa | H01Q 3/26 |
| 2018/0089531 A1 * | 3/2018 | Geva | G06F 19/30 |

OTHER PUBLICATIONS

Ahn S., et al., "Magnetic Field Design for Low EMF and High Efficient Wireless Power Transfer System in On-Line Electric Vehicles," CIRP Design Conference, 2011, pp. 233-239.

Kim H., et al., "Coil Design and Measurements of Automotive Magnetic Resonant Wireless Charging System for High-Efficiency and Low Magnetic Field Leakage," IEEE Transactions on Microwave Theory and Techniques, 2016, pp. 1-18.

Ombach G., et al., "Optimum Magnetic Solution for Interoperable System for Stationary Wireless EV Charging," Tenth International Conference on Ecological Vehicles and Renewable Energies (EVER), 2015, 8 pages.

Shin J., et al., "Design and Implementation of Shaped Magnetic-Resonance-Based Wireless Power Transfer System for Roadway-Powered Moving Electric Vehicles," IEEE Transactions on Industrial Electronics, Mar. 2014, vol. 61 (3), pp. 1179-1192.

\* cited by examiner

APPARATUS AND METHODS FOR REDUCING MAGNETIC FIELD EMISSIONS BETWEEN WIRELESS POWER TRANSMITTERS

TECHNICAL FIELD

This application is generally related to wireless power transfer, and in particular, reducing emissions related to wireless power transfer.

BACKGROUND

Chargeable systems, such as vehicles, have been introduced that include locomotion power derived from electricity received from an energy storage device such as a battery. For example, hybrid electric vehicles include on-board chargers that use power from vehicle braking and traditional motors to charge the vehicles. Vehicles that are solely electric generally receive the electricity for charging the batteries from other sources. Battery electric vehicles are often proposed to be charged through some type of wired alternating current (AC) such as household or commercial AC supply sources. The wired charging connections require cables or other similar connectors that are physically connected to a power supply. Cables and similar connectors may sometimes be inconvenient or cumbersome and have other drawbacks. It is desirable to provide wireless power transfer systems that are capable of transferring power in free space (e.g., via a wireless field) to be used to charge the electric vehicle to overcome some of the deficiencies of wired charging solutions.

SUMMARY

The systems, methods, and devices of the present disclosure each have several aspects, no single one of which is solely responsible for its desirable attributes. The implementations disclosed herein each have several innovative aspects, no single one of which is solely responsible for the desirable attributes of the present disclosure. Without limiting the scope of this present disclosure as expressed by the claims which follow, some features will now be discussed briefly. After considering this discussion, and particularly after reading the section entitled "Detailed Description," one will understand how the features of the various implementations of this present disclosure provide advantages that include improved wireless charging between wireless power transmitting units and wireless power receiving units.

In an aspect of the disclosure, an apparatus for wirelessly providing power is provided. The apparatus comprises a communication circuit configured to communicate with a first wireless power transmitter and a second wireless power transmitter. The apparatus further comprises a controller circuit configured to identify a first phase of a first current provided to the first wireless power transmitter, the first current generating a first magnetic field. The controller further configured to determine a time to provide a second current to the second wireless power transmitter, the second current generating a second magnetic field. The controller further configured to provide the second current to the second wireless power transmitter at the determined time with a second phase having a phase difference between the first phase configured to reduce a magnitude of a combined magnetic field of the first and second magnetic fields in a region between the first and second wireless power transmitters.

Another aspect of the disclosure relates to another apparatus for wirelessly providing power. The apparatus comprises means for communicating with a first a first wireless power transmitter and a second wireless power transmitter. The apparatus further comprises means for identifying a first phase of a first current provided to the first wireless power transmitter, the first current generating a first magnetic field. The apparatus further comprises means for determining a time to provide a second current to the second wireless power transmitter, the second current generating a second magnetic field. The apparatus further comprises means for providing the second current to the second wireless power transmitter at the determined time with a second phase having a phase difference between the first phase that reduces a magnitude of a combined magnetic field of the first and second magnetic fields in a region between the first and second wireless power transmitters.

Another aspect of the disclosure relates to a method for wirelessly transmitting power to power or charge a wireless power receiver. The method includes communicating with a first wireless power transmitter and a second wireless power transmitter. The method further includes identifying a first phase of a first current provided to the first wireless transmitter, the first current generating a first magnetic field. The method further includes determining a time to provide a second current to the second wireless power transmitter, the second current generating a second magnetic field. The method further includes providing the second current to the second wireless power transmitter at the determined time with a second phase having a phase difference between the first phase that reduces a magnitude of a combined magnetic field of the first and second magnetic fields in a region between the first and second wireless power transmitters.

Another aspect of the disclosure relates to a non-transitory computer readable storage medium comprising instructions that when executed cause an apparatus to perform a method for wirelessly providing power. The method includes communicating with a first wireless power transmitter and a second wireless power transmitter. The method further includes identifying a first phase of a first current provided to the first wireless power transmitter, the first current generating a first magnetic field. The method further includes determining a time to provide a second current to the second wireless power transmitter, the second current generating a second magnetic field. The method further includes providing the second current to the second wireless power transmitter at the determined time with a second phase having a phase difference between the first phase that reduces a magnitude of a combined magnetic field of the first and second magnetic fields in a region between the first and second wireless power transmitters.

BRIEF DESCRIPTION OF THE DRAWINGS

The above-mentioned aspects, as well as other features, aspects, and advantages of the present technology will now be described in connection with various embodiments, with reference to the accompanying drawings. The illustrated embodiments, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION

In the following detailed description, reference is made to the accompanying drawings, which form a part of the present disclosure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and form part of this disclosure.

Wireless power transfer may refer to transferring any form of energy associated with electric fields, magnetic fields, electromagnetic fields, or otherwise from a transmitter to a receiver without the use of physical electrical conductors (e.g., power may be transferred through free space). The power output into a wireless field (e.g., a magnetic field or an electromagnetic field) may be received, captured by, or coupled by a "receive antenna" to achieve power transfer.

The terminology used herein is for the purpose of describing particular embodiments only and is not intended to be limiting of the disclosure. It will be understood by those within the art that if a specific number of a claim element is intended, such intent will be explicitly recited in the claim, and in the absence of such recitation, no such intent is present. For example, as used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list.

Figure 1:
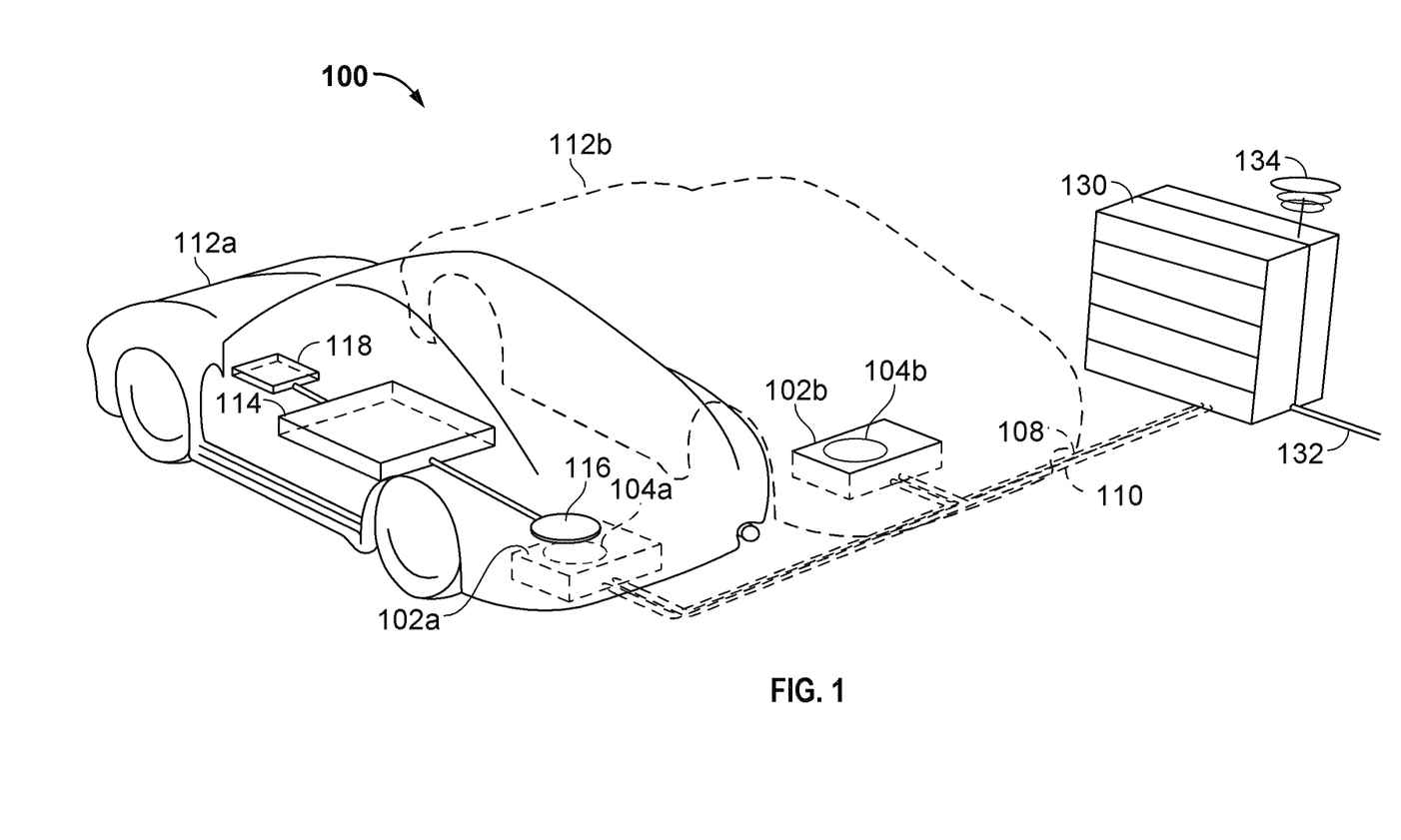
FIG. 1 is a diagram of a wireless power transfer system for charging an electric vehicle, in accordance with some implementations.

FIG. 1 is a diagram of a wireless power transfer system 100 for charging electric vehicles 112a and 112b, in accordance with some implementations. The wireless power transfer system 100 enables charging of electric vehicles 112a and 112b while the electric vehicles 112a and 112b are parked near a base wireless charging system 102a and a base wireless charging system 102b, respectively. In some aspects, the base wireless charging systems 102a and 102b may be referred to as base pads, primary coils or wireless power transmitters. Spaces for two electric vehicles are illustrated in a parking area to be parked over corresponding base wireless charging system 102a and 102b. In some implementations, a local distribution center 130 may be connected to a power backbone 132 and configured to provide an alternating current (AC) or a direct current (DC) supply through a power link 110 to the base wireless charging systems 102a and 102b. In some embodiments, the AC or DC currents supplied to the base wireless charging systems 102a and 102b may be individually controlled. The base wireless charging system 102a also includes a base system induction coil 104a for wirelessly transferring or receiving power. An electric vehicle 112 may include a battery unit 118, an electric vehicle induction coil 116, and an electric vehicle wireless charging system 114. The electric vehicle induction coil 116 may interact with the base system induction coil 104a for example, via a region of the magnetic field generated by the base system induction coil 104a.

In some implementations, the electric vehicle induction coil 116 may receive power when the electric vehicle induction coil 116 is located in an energy field produced by the base system induction coil 104a. The field corresponds to a region where energy output by the base system induction coil 104a may be captured by an electric vehicle induction coil 116. For example, the energy output by the base system induction coil 104a may be at a level sufficient to charge or power the electric vehicle 112. In some cases, the field may correspond to the "near field" of the base system induction coil 104a. The near-field may correspond to a region in which there are strong reactive fields resulting from the currents and charges in the base system induction coil 104a that do not radiate power away from the base system induction coil 104a. In some cases the near-field may correspond to a region that is within about 1 or $\frac{1}{2\pi}$ of a wavelength of the base system induction coil 104a (and vice versa for the electric vehicle induction coil 116) as will be further described below.

Local distribution 130 may be configured to communicate with external sources (e.g., a power grid) via a communication backhaul 134, and with the base wireless charging system 102a via a communication link 108.

In some implementations the electric vehicle induction coil 116 may be aligned with the base system induction coil 104a and, therefore, disposed within a near-field region simply by the driver positioning the electric vehicle 112 correctly relative to the base system induction coil 104a. In other implementations, the driver may be given visual feedback, auditory feedback, or combinations thereof to determine when the electric vehicle 112 is properly placed for wireless power transfer. In yet other implementations, the electric vehicle 112 may be positioned by an autopilot system, which may move the electric vehicle 112 back and forth (e.g., in zig-zag movements) until an alignment error has reached a tolerable value. This may be performed automatically and autonomously by the electric vehicle 112 without or with only minimal driver intervention provided that the electric vehicle 112 is equipped with a servo steering wheel, ultrasonic sensors, and intelligence to adjust the vehicle. In still other implementations, the electric vehicle induction coil 116, the base system induction coil 104a, or a combination thereof may have functionality for displacing and moving the induction coils 116 and 104a relative to each other to more accurately orient them and develop more efficient coupling therebetween.

The base wireless charging system 102a may be located in a variety of locations. As non-limiting examples, some suitable locations include a parking area at a home of the electric vehicle 112 owner, parking areas reserved for electric vehicle wireless charging modeled after conventional petroleum-based filling stations, and parking lots at other locations such as shopping centers and places of employment.

Charging electric vehicles wirelessly may provide numerous benefits. For example, charging may be performed automatically, virtually without driver intervention and manipulations thereby improving convenience to a user. There may also be no exposed electrical contacts and no mechanical wear out, thereby improving reliability of the wireless power transfer system 100. Manipulations with cables and connectors may not be needed, and there may be no cables, plugs, or sockets that may be exposed to moisture and water in an outdoor environment, thereby improving safety. There may also be no sockets, cables, and plugs visible or accessible, thereby reducing potential vandalism of power charging devices. Further, since an electric vehicle 112 may be used as distributed storage devices to stabilize a power grid, a docking-to-grid solution may be used to increase availability of vehicles for Vehicle-to-Grid (V2G) operation.

A wireless power transfer system 100 as described with reference to FIG. 1 may also provide aesthetical and non-impedimental advantages. For example, there may be no charge columns and cables that may be impedimental for vehicles and/or pedestrians.

As a further explanation of the vehicle-to-grid capability, the wireless power transmit and receive capabilities may be configured to be reciprocal such that the base wireless charging system 102a transfers power to the electric vehicle 112 and the electric vehicle 112 transfers power to the base wireless charging system 102a e.g., in times of energy shortfall. This capability may be useful to stabilize the power distribution grid by allowing electric vehicles to contribute power to the overall distribution system in times of energy shortfall caused by over demand or shortfall in renewable energy production (e.g., wind or solar).

Figure 2:
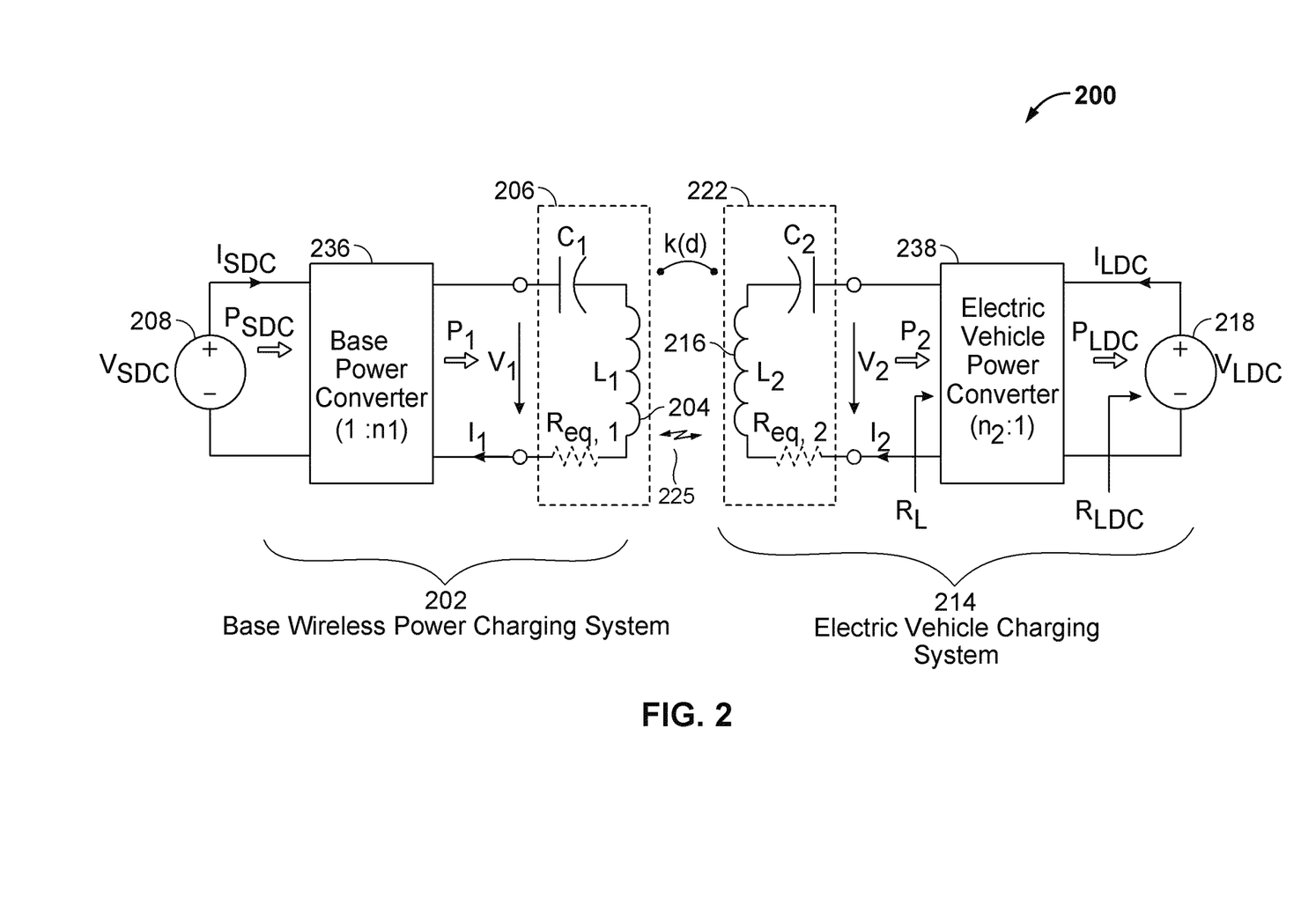
FIG. 2 is a schematic diagram of core components of the wireless power transfer system of FIG. 1.

FIG. 2 is a schematic diagram of components of the wireless power transfer system 100 of FIG. 1. As shown in FIG. 2, the wireless power transfer system 200 may include a base system transmit circuit 206 including a base system induction coil 204 having an inductance $L_1$. The wireless power transfer system 200 further includes an electric vehicle receive circuit 222 including an electric vehicle induction coil 216 having an inductance $L_2$. Implementations described herein may use capacitively loaded wire loops (i.e., multi-turn coils) forming a resonant structure that is capable of efficiently transferring energy from a primary structure (transmitter) to a secondary structure (receiver) via a magnetic or electromagnetic near field if both primary and secondary are tuned to a common resonant frequency. The coils may be used for the electric vehicle induction coil 216 and the base system induction coil 204. Using resonant structures for coupling energy may be referred to "magnetic coupled resonance," "electromagnetic coupled resonance," and/or "resonant induction." The operation of the wireless power transfer system 200 will be described based on power transfer from a base wireless power charging system 202 to an electric vehicle 112, but is not limited thereto. For example, as discussed above, the electric vehicle 112 may transfer power to the base wireless charging system 102a.

With reference to FIG. 2, a power supply 208 (e.g., AC or DC) supplies power $P_{SDC}$ to the base wireless power charging system 202 to transfer energy to an electric vehicle 112. The base wireless power charging system 202 includes a base charging system power converter 336. The base charging system power converter 236 may include circuitry such as an AC/DC converter configured to convert power from standard mains AC to DC power at a suitable voltage level, and a DC/low frequency (LF) converter configured to convert DC power to power at an operating frequency suitable for wireless high power transfer. The base charging system power converter 236 supplies power $P_1$ to the base system transmit circuit 206 including the capacitor $C_1$ in series with the base system induction coil 204 to emit a magnetic field 225 at a desired frequency. The capacitor $C_1$ may be coupled with the base system induction coil 204 either in parallel or in series, or may be formed of several reactive elements in any combination of parallel or series topology. The capacitor $C_1$ may be provided to form a resonant circuit with the base system induction coil 204 that resonates at a desired frequency. The base system induction coil 204 receives the power $P_1$ and wirelessly transmits power at a level sufficient to charge or power the electric vehicle 112. For example, the power level provided wirelessly by the base system induction coil 204 may be on the order of kilowatts (kW) (e.g., anywhere from 1 kW to 110 kW or higher or lower) and, in some implementations, may be transferred at frequencies including but not limited to 85 kHz.

The base system transmit circuit 206 including the base system induction coil 204 and electric vehicle receive circuit 222 including the electric vehicle induction coil 216 may be tuned to substantially the same frequencies and may be positioned within the near-field of a magnetic field transmitted by one of the base system induction coil 204 and the electric vehicle induction coil 116. In this case, the base system induction coil 204 and electric vehicle induction coil 116 may become coupled to one another such that power may be transferred to the electric vehicle receive circuit 222 including capacitor $C_2$ and electric vehicle induction coil 116. The capacitor $C_2$ may be provided to form a resonant circuit with the electric vehicle induction coil 216 that resonates at a desired frequency. The capacitor $C_2$ may be coupled with the electric vehicle induction coil 204 either in parallel or in series, or may be formed of several reactive elements in any combination of parallel or series topology. Element k(d) represents the mutual coupling coefficient resulting at coil separation. Equivalent resistances $R_{eq,1}$ and $R_{eq,2}$ represent the losses that may be inherent to the induction coils 204 and 216 and the anti-reactance capacitors $C_1$ and $C_2$. The electric vehicle receive circuit 222 including the electric vehicle induction coil 216 and capacitor $C_2$ receives power $P_2$ and provides the power $P_2$ to an electric vehicle power converter 238 of an electric vehicle charging system 214.

The electric vehicle power converter 238 may include, among other things, a LF/DC converter configured to convert power at an operating frequency back to DC power at a voltage level matched to the voltage level of an electric vehicle battery unit 218. The electric vehicle power converter 238 may provide the converted power $P_{LDC}$ to charge the electric vehicle battery unit 218. The power supply 208, base charging system power converter 236, and base system induction coil 204 may be stationary and located at a variety of locations as discussed above. The battery unit 218, electric vehicle power converter 238, and electric vehicle induction coil 216 may be included in an electric vehicle charging system 214 that is part of electric vehicle 112 or part of the battery pack (not shown). The electric vehicle charging system 214 may also be configured to provide power wirelessly through the electric vehicle induction coil 216 to the base wireless power charging system 202 to feed power back to the grid. Each of the electric vehicle induction coil 216 and the base system induction coil 204 may act as transmit or receive induction coils based on the mode of operation.

While not shown, the wireless power transfer system 200 may include a load disconnect unit (LDU) to safely disconnect the electric vehicle battery unit 218 or the power supply 208 from the wireless power transfer system 200. For example, in case of an emergency or system failure, the LDU may be triggered to disconnect the load from the wireless power transfer system 200. The LDU may be provided in addition to a battery management system for managing charging to a battery, or it may be part of the battery management system.

Further, the electric vehicle charging system 214 may include switching circuitry (not shown) for selectively connecting and disconnecting the electric vehicle induction coil 216 to the electric vehicle power converter 238. Disconnecting the electric vehicle induction coil 216 may suspend charging and also may adjust the "load" as "seen" by the base wireless charging system 102a (acting as a transmitter), which may be used to "cloak" the electric vehicle charging system 114 (acting as the receiver) from the base wireless charging system 102a. The load changes may be detected if the transmitter includes the load sensing circuit. Accordingly, the transmitter, such as a base wireless charging system 202, may have a mechanism for determining when receivers, such as an electric vehicle charging system 114, are present in the near-field of the base system induction coil 204.

As described above, in operation, assuming energy transfer towards the vehicle or battery, input power is provided from the power supply 208 such that the base system induction coil 204 generates a field for providing the energy transfer. The electric vehicle induction coil 216 couples to the radiated field and generates output power for storage or consumption by the electric vehicle 112. As described above, in some implementations, the base system induction coil 204 and electric vehicle induction coil 116 are configured according to a mutual resonant relationship such that when the resonant frequency of the electric vehicle induction coil 116 and the resonant frequency of the base system induction coil 204 are very close or substantially the same. Transmission losses between the base wireless power charging system 202 and electric vehicle charging system 214 are minimal when the electric vehicle induction coil 216 is located in the near-field of the base system induction coil 204.

As stated, an efficient energy transfer occurs by coupling a large portion of the energy in the near field of a transmitting induction coil to a receiving induction coil rather than propagating most of the energy in a magnetic wave to the far-field. When in the near field, a coupling mode may be established between the transmit induction coil and the receive induction coil. The area around the induction coils where this near field coupling may occur is referred to herein as a near field coupling mode region.

While not shown, the base charging system power converter 236 and the electric vehicle power converter 238 may both include an oscillator, a driver circuit such as a power amplifier, a filter, and a matching circuit for efficient coupling with the wireless power induction coil. The oscillator may be configured to generate a desired frequency, which may be adjusted in response to an adjustment signal. The oscillator signal may be amplified by a power amplifier with an amplification amount responsive to control signals. The filter and matching circuit may be included to filter out harmonics or other unwanted frequencies and match the impedance of the power conversion module to the wireless power induction coil. The power converters 236 and 238 may also include a rectifier and switching circuitry to generate a suitable power output to charge the battery.

The electric vehicle induction coil 216 and base system induction coil 204 as described throughout the disclosed implementations may be referred to or configured as "loop" antennas, and more specifically, multi-turn loop antennas. The induction coils 204 and 216 may also be referred to herein or be configured as "magnetic" antennas. The term "coils" is intended to refer to a component that may wirelessly output or receive energy four coupling to another "coil." The coil may also be referred to as an "antenna" of a type that is configured to wirelessly output or receive power. As used herein, coils 204 and 216 are examples of "power transfer components" of a type that are configured to wirelessly output, wirelessly receive, and/or wirelessly relay power. Loop (e.g., multi-turn loop) antennas may be configured to include an air core or a physical core such as a ferrite core. An air core loop antenna may allow the placement of other components within the core area. Physical core antennas including ferromagnetic or ferromagnetic materials may allow development of a stronger magnetic field and improved coupling.

As discussed above, efficient transfer of energy between a transmitter and receiver occurs during matched or nearly matched resonance between a transmitter and a receiver. However, even when resonance between a transmitter and receiver are not matched, energy may be transferred at a lower efficiency. Transfer of energy occurs by coupling energy from the near field of the transmitting induction coil to the receiving induction coil residing within a region (e.g., within a predetermined frequency range of the resonant frequency, or within a predetermined distance of the near-field region) where this near field is established rather than propagating the energy from the transmitting induction coil into free space.

A resonant frequency may be based on the inductance and capacitance of a transmit circuit including an induction coil (e.g., the base system induction coil 204) as described above. As shown in FIG. 2, inductance may generally be the inductance of the induction coil, whereas, capacitance may be added to the induction coil to create a resonant structure at a desired resonant frequency. As a non-limiting example, as shown in FIG. 2, a capacitor may be added in series with the induction coil to create a resonant circuit (e.g., the base system transmit circuit 206) that generates the magnetic field 225. Accordingly, for larger diameter induction coils, the value of capacitance needed to induce resonance may decrease as the diameter or inductance of the coil increases. Inductance may also depend on a number of turns of an induction coil. Furthermore, as the diameter of the induction coil increases, the efficient energy transfer area of the near field may increase. Other resonant circuits are possible. As another non limiting example, a capacitor may be placed in parallel between the two terminals of the induction coil (e.g., a parallel resonant circuit). Furthermore an induction coil may be designed to have a high quality (Q) factor to improve the resonance of the induction coil. For example, the Q factor may be 300 or greater.

As described above, according to some implementations, coupling power between two induction coils that are in the near field of one another is disclosed. As described above, the near field may correspond to a region around the induction coil in which magnetic fields exist but may not propagate or radiate away from the induction coil. Near-field coupling-mode regions may correspond to a volume that is near the physical volume of the induction coil, typically within a small fraction of the wavelength. According to some implementations, magnetic induction coils, such as single and multi-turn loop antennas, are used for both transmitting and receiving since magnetic near field amplitudes in practical implementations tend to be higher for magnetic type coils in comparison to the electric near fields of an electric type antenna (e.g., a small dipole). This allows for potentially higher coupling between the pair. Furthermore, "electric" antennas (e.g., dipoles and monopoles) or a combination of magnetic and electric antennas may be used.

Figure 3:
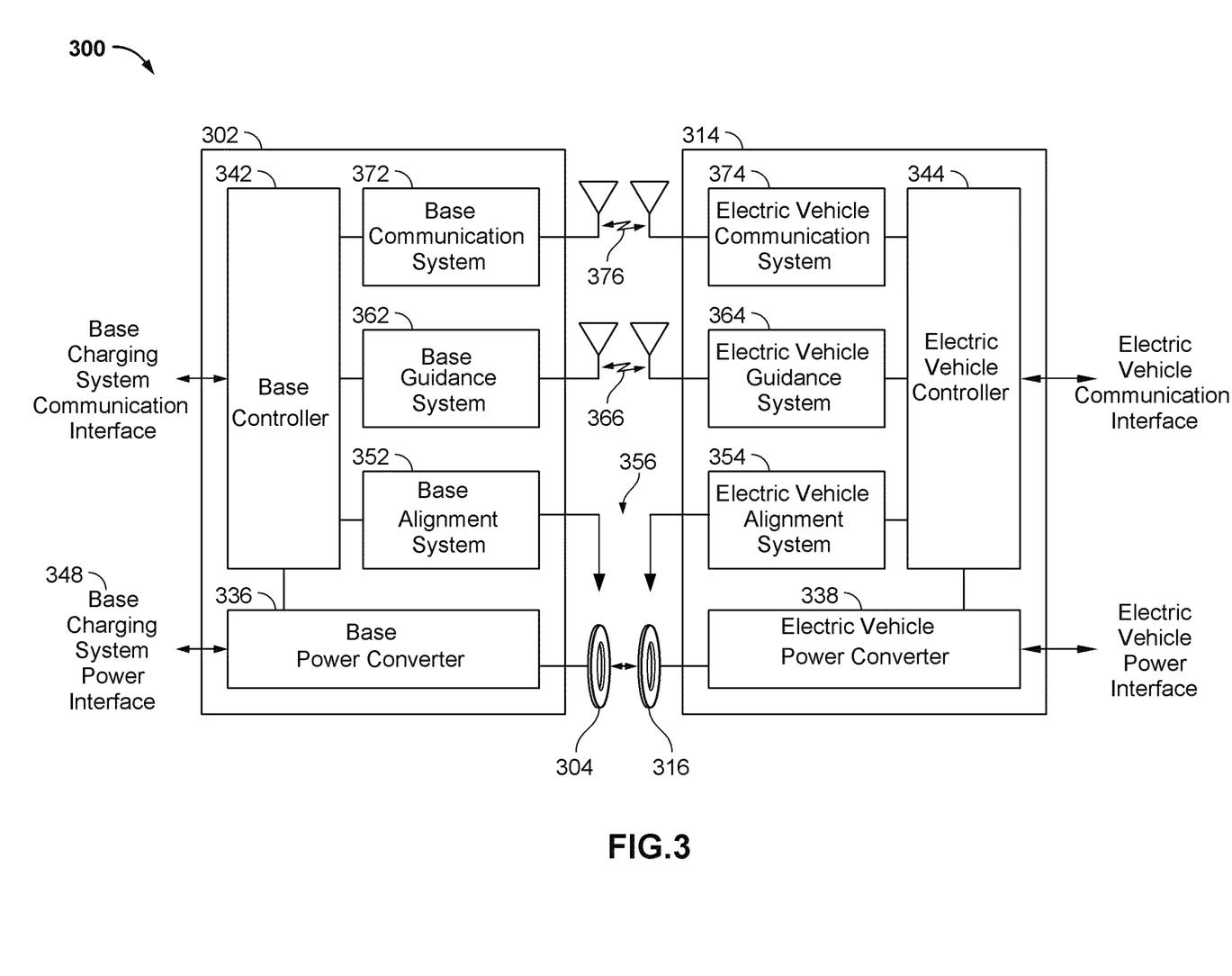
FIG. 3 is another functional block diagram showing components of the wireless power transfer system of FIG. 1.

FIG. 3 is another functional block diagram showing components of the wireless power transfer system 100 of FIG. 1. The wireless power transfer system 300 illustrates a communication link 376, a guidance link 366, and alignment systems 352, 354 for the base system induction coil 304 and electric vehicle induction coil 316. As described above with reference to FIG. 2, and assuming energy flow towards the electric vehicle 112, in FIG. 3 a base charging system power interface 348 may be configured to provide power to a charging system power converter 336 from a power source, such as an AC or DC power supply (e.g., power supply 208, as illustrated in FIG. 2). The base charging system power converter 336 may receive AC or DC power from the base charging system power interface 348 to excite the base system induction coil 304 at or near its resonant frequency. The electric vehicle induction coil 316, when in the near field coupling-mode region, may receive energy from the near field coupling mode region to oscillate at or near the resonant frequency. The electric vehicle power converter 338 converts the oscillating signal from the electric vehicle induction coil 316 to a power signal suitable for charging a battery via the electric vehicle power interface.

The base wireless charging system 302 includes a base charging system controller 342 and the electric vehicle charging system 234 includes an electric vehicle controller 344. The base charging system controller 342 may include a base charging system communication interface to other systems (not shown) such as, for example, a computer, and a power distribution center, or a smart power grid. The electric vehicle controller 344 may include an electric vehicle communication interface to other systems (not shown) such as, for example, an on-board computer on the vehicle, other battery charging controller, other electronic systems within the vehicles, and remote electronic systems.

The base charging system controller 342 and electric vehicle controller 344 may include subsystems or modules for specific application with separate communication channels. As non-limiting examples, a base charging alignment system 352 can communicate with an electric vehicle alignment system 354 through a communication link 356 to provide a feedback mechanism for more closely aligning the base system induction coil 304 and electric vehicle induction coil 316, either autonomously or with operator assistance. Similarly, a base charging guidance system 362 can communicate with an electric vehicle guidance system 364 through a guidance link 366 to provide a feedback mechanism to guide an operator in aligning the base system induction coil 304 and electric vehicle induction coil 316. These communications channels may be separate physical channels or separate logical channels. In addition, there may be separate general-purpose communication links (e.g., channels) supported by base charging communication system 372 and electric vehicle communication system 374 for communicating other information between the base wireless power charging system 302 and the electric vehicle charging system 314. This information may include information about electric vehicle characteristics, battery characteristics, charging status, and power capabilities of both the base wireless power charging system 302 and the electric vehicle charging system 314, as well as maintenance and diagnostic data for the electric vehicle 112. These communication channels may be separate physical communication channels such as, for example, Bluetooth, zigbee, cellular, etc.

Electric vehicle controller 344 may also include a battery management system (BMS) (not shown) that manages charge and discharge of the electric vehicle principal battery, a parking assistance system based on microwave or ultrasonic radar principles, a brake system configured to perform a semi-automatic parking operation, and a steering wheel servo system configured to assist with a largely automated parking 'park by wire' that may provide higher parking accuracy, thus reducing the need for mechanical horizontal induction coil alignment in any of the base wireless charging system 102a and the electric vehicle charging system 114. Further, electric vehicle controller 344 may be configured to communicate with electronics of the electric vehicle 112. For example, electric vehicle controller 344 may be configured to communicate with visual output devices (e.g., a dashboard display), acoustic/audio output devices (e.g., buzzer, speakers), mechanical input devices (e.g., keyboard, touch screen, and pointing devices such as joystick, trackball, etc.), and audio input devices (e.g., microphone with electronic voice recognition).

Furthermore, the wireless power transfer system 300 may include detection and sensor systems. For example, the wireless power transfer system 300 may include sensor circuits for use with systems to properly guide the driver or the vehicle to the charging spot, sensors to mutually align the induction coils with the required separation/coupling, sensors to detect objects that may obstruct the electric vehicle induction coil 316 from moving to a particular height and/or position to achieve coupling, and safety sensors for use with systems to perform a reliable, damage free, and safe operation of the system. For example, a safety sensor may include a sensor for detection of presence of animals or children approaching the wireless power induction coils 104a, 116 beyond a safety radius, detection of metal objects near the base system induction coil 304 that may be heated up (induction heating), detection of hazardous events such as incandescent objects on the base system induction coil 304, and temperature monitoring of the base wireless power charging system 302 and electric vehicle charging system 214 components.

The wireless power transfer system 300 may also support plug-in charging via a wired connection. A wired charge port may integrate the outputs of the two different chargers prior to transferring power to or from the electric vehicle 112. Switching circuits may provide the functionality as needed to support both wireless charging and charging via a wired charge port.

To communicate between a base wireless charging system 302 and an electric vehicle charging system 314, the wireless power transfer system 300 may use both in-band signaling and an RF data modem (e.g., Ethernet over radio in an unlicensed band). The out-of-band communication may provide sufficient bandwidth for the allocation of value-add services to the vehicle user/owner. A low depth amplitude or phase modulation of the wireless power carrier may serve as an in-band signaling system with minimal interference.

In addition, some communication may be performed via the wireless power link without using specific communications antennas. For example, the wireless power induction coils 304 and 316 may also be configured to act as wireless communication transmitters. Thus, some implementations of the base wireless power charging system 302 may include a controller (not shown) for enabling keying type protocol on the wireless power path. By keying the transmit power level (amplitude shift keying) at predefined intervals with a predefined protocol, the receiver may detect a serial communication from the transmitter. The base charging system power converter 336 may include a load sensing circuit (not shown) for detecting the presence or absence of active electric vehicle receivers in the vicinity of the near field generated by the base system induction coil 304. By way of example, a load sensing circuit monitors the current flowing to the power amplifier, which is affected by the presence or absence of active receivers in the vicinity of the near field generated by base system induction coil 104a. Detection of changes to the loading on the power amplifier may be monitored by the base charging system controller 342 for use in determining whether to enable the oscillator for transmitting energy, to communicate with an active receiver, or a combination thereof.

To enable wireless high power transfer, some implementations may be configured to transfer power at a frequency in the range from 20-150 kHz. This low operating frequency may allow highly efficient power conversion that may be achieved using solid state devices. In addition, there may be less coexistence issues with radio systems compared to other bands.

In some wireless power transfer system, there may be concerns that such systems may not be fully compliant to magnetic field exposure standard limits. In some aspects, where base wireless charging systems 102a and 102b are installed on adjacent parking spaces, it may become an issue if these adjacent systems are both working at full power simultaneously. In these cases, the magnetic field amplitude of the combined field where the adjacent fields magnetic overlap can be higher than a single base wireless charging system. In some aspects, the magnitude of the combined magnetic field can be doubled for some points in space between the two adjacent base wireless charging systems 102a and 102b. The higher magnitude of the combined magnetic field may represent a higher risk to implantable medical device (IMD) users, interference with other devices, damage to living persons or animals, or damage to other devices/objects.

Embodiments described herein relate to reducing magnetic field emissions between two or more base wireless power charging systems. With reference to FIG. 1, it may be possible to actively monitor and control the primary currents in a first base wireless power charging system 102a and to activate a second base wireless power charging system 102b (adjacent to the first base wireless power charging system 102a) with a specific phase difference (or selecting a slightly different frequency) relative to the phase of the primary current in the first base wireless power charging system 102a to reduce emissions in between the base wireless power charging systems 102a and 102b. In some aspects, there is a communication link (e.g., communication link 108) between the local distribution center 130 and each of the first and second base wireless power charging systems 102a and 102b. In some aspects, the local distribution center 130 may also be configured to communicate with a plurality of other nearby base wireless power charging systems. As described above, the local distribution center 130 also provides power to each of the first and second base wireless power charging systems 102 through the power link 110. The embodiments described herein assume that the first and second base wireless power charging systems 102a and 102b are synchronized to the same clock.

Figure 4:
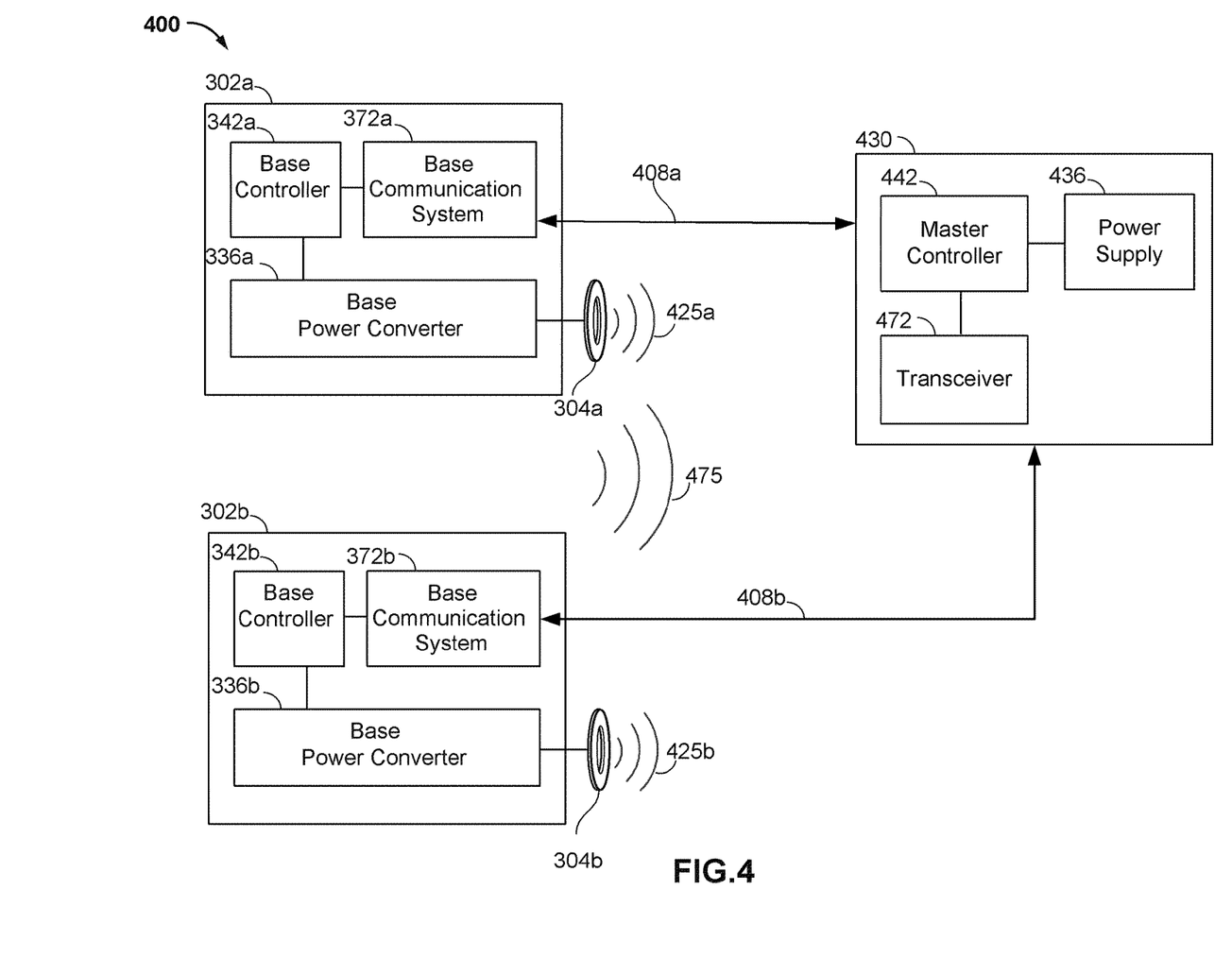
FIG. 4 is another functional block diagram showing components of the wireless power transfer system of FIG. 1.

FIG. 4 is a diagram of a wireless power transfer system 400 comprising a local distribution center 430, a base wireless power charging system 302a and a base wireless power charging system 302b, in accordance with an example implementation. The local distribution center 430 may be a local distribution center of similar operation and functionality as the local distribution center 130 of FIG. 1. However, the local distribution center 430 provides additional details regarding the components of the local distribution center 430 than FIG. 1. In some aspects, the base wireless power charging systems 302a and 302b may also be referred to as wireless power transmitters or base pads and may comprise similar components and perform similar functions as the base wireless power charging systems 102, 202, and 302 of FIGS. 1-3.

As shown in FIG. 4, the local distribution center 430 comprises a power supply circuit 436, a master controller 442, and a transceiver circuit 472. In some aspects, the master controller 442 controls the charging functions of the base wireless power charging systems 302a and 302b. In some embodiments, the power supply circuit 436 supplies power to the base wireless power charging systems 302a and 302 and the transceiver circuit 472 communicates with the base wireless power charging systems 302a and 302b.

In some aspects, the master controller 442 can obtain the phase angle of the base wireless power charging system 302a and then determine a specific time of when to turn on the base wireless power charging system 302b with a specific phase difference such that the emissions between the two are reduced. In some aspects, the master controller 442 obtains the phase angle of the base wireless power charging system 302a from communications between the base communication system 372a and the transceiver 472 via communication link 408a. In other embodiments, the master controller 442 obtains the phase angle through a direct measurement of a current being provided to the base wireless power charging system 302a by the power supply circuit 436.

In some aspects, the transceiver circuit 472 communicates to the base wireless power charging system 302b, via the communication link 408a, the specific time to turn on the base wireless power charging system 302b that was determined by the master controller 442. At the determined time, the power supply circuit 436 then activates the base wireless power charging system 302b to reduce a combined magnetic field of the base wireless power charging systems 302a and 302b. In some aspects, the master controller 442 provides power, through the power supply circuit 436, to the base wireless power charging system 302b at the determined time without the transceiver circuit 472 transmitting a separate communication to the base communication system 372b.

In some aspects, the base controller 342b may obtain the phase angle of the base wireless power charging system 302a directly from the base wireless power charging system 302a. In some aspects, the base controller 342b obtains the phase angle via communications between the base communication systems 372a and 372b and/or the electric vehicles 112a and 112b. In other aspects, the base controller 342b obtains the phase angle through a direct measurement of the magnetic field generated by the base wireless power charging system 302a, or through any other means. In some embodiments, the base controller 342b may then determine when to activate the base system induction coil 304b to generate the magnetic field 425b.

The phase difference between the currents of the base wireless power charging systems 302a and 302b may cause the magnetic fields 425a and 425b to not fully add up in a region where the two fields overlap and are combined (e.g., by destructive interference of the fields) to form the combined magnetic field 475. Such destructive interference in the overlapping region may beneficially reduce emissions so that the emissions in overlapping region do not exceed any human exposure thresholds or other magnetic field emission requirements. In some aspects, it may be desirable to have a phase difference of 180 degrees between the magnetic fields 425a and 425b. In other aspects, the phase difference between the magnetic fields 425a and 425b may be any value that reduces the combined magnetic field 475 below a safety and/or emission threshold. Additionally, while the phase difference between the magnetic fields 425a and 425b may reduce the magnetic field in the overlapping region, the phase difference may have a small or negligible effect on the wireless power transfer between each of the base wireless power charging system 302a and the electric vehicle 112a and the base wireless power charging system 302b and the electric vehicle 112b, respectively.

In some embodiments, it may be desirable to reduce the combined magnetic field 475 by adjusting a frequency of the current generating the magnetic field 425b. In such aspects, the frequency difference between the base wireless power charging systems 302a and 302b may cause the magnetic fields 425a and 425b to not fully add up in the overlapping region where the two fields are combined (e.g., by destructive interference of the fields) to form the combined magnetic field 475. The frequency difference between the base wireless power charging systems 302a and 302b may cause jittering and a non-sinusoidal combined magnetic field 475 whose average combined magnetic field strength is reduced compared to each of the magnetic fields 425a and 425b. In some aspects, the frequency difference between the magnetic fields 425a and 425b may be any value that reduces the combined magnetic field 475 below a safety and/or emission threshold. In some embodiments, using a frequency difference, either alone or in combination with a phase difference, may beneficially provide a simple method of reducing an average magnetic field strength.

Figure 5A:
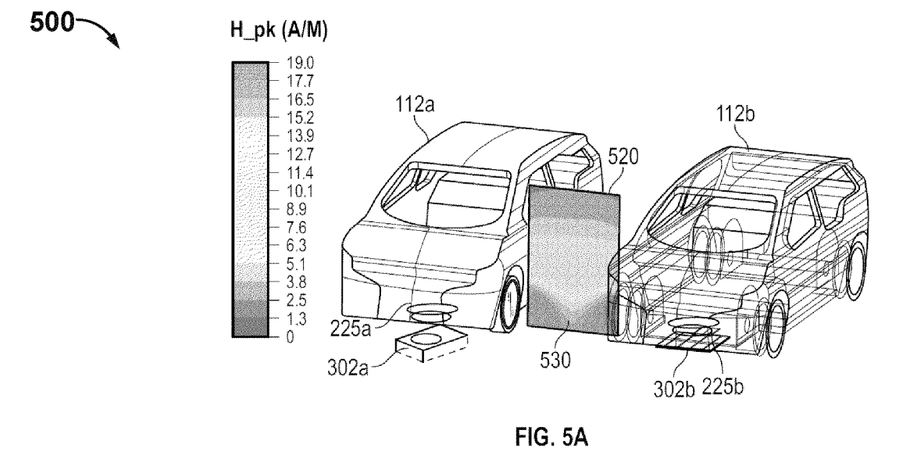
FIG. 5A is a diagram of a combined magnetic field strength resulting from a wireless power transfer system comprising multiple wireless power transmitters, in accordance with an exemplary implementation.

FIG. 5A is a diagram of a combined magnetic field 530 of a wireless power transfer system 500 comprising the base wireless power charging system 302a and the base wireless power charging system 302b, in accordance with an exemplary implementation. As shown in FIG. 5A, both the base wireless power charging systems 302a and 302b are activated and transferring power to the electric vehicles 112a and 112b. Each of the base wireless power charging systems 302a and 302b generate a magnetic field 225a and 225b, respectively. As shown in FIG. 5A, in space 520 between the base wireless power charging systems 302a and 302b and between the electric vehicles 112a and 112b, the magnet fields 225a and 225b are in phase and combine to create a combined magnetic field 530 whose strength is amplified compared to each of the magnetic fields 225a and 225b. As described above, the combined magnetic field 530 may result in issues related to emission standards requirements, IMD users, interference with other devices, damage to living persons or animals, and/or damage to other devices/objects.

Figure 5B:
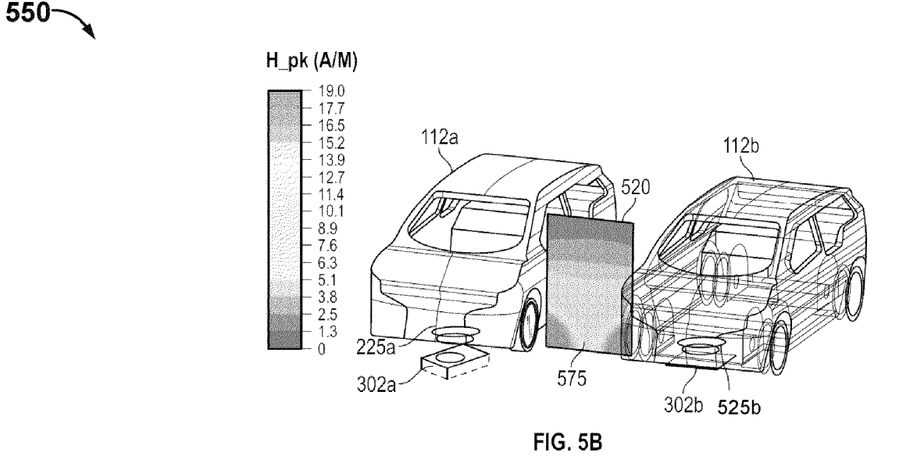
FIG. 5B is a diagram of a combined magnetic field strength resulting from a wireless power transfer system comprising multiple wireless power transmitters, in accordance with an exemplary implementation.

In some embodiments, it may be desirable to reduce the combined magnetic field 530 of FIG. 5A. FIG. 5B is a diagram of a combined magnetic field 575 of a wireless power transfer system 550, in accordance with an exemplary implementation. Wireless power transfer system 550 is similar to and adapted from wireless power transfer system 500 of FIG. 5A and only differences between the wireless power transfer systems 500 and 550 are described for the sake of brevity.

As shown in FIG. 5B, both the base wireless power charging systems 302a and 302b are activated and transferring power to the electric vehicles 112a and 112b. However, the base wireless power charging system 302b generates a magnetic field 525b with a specific phase difference relative to the phase of the primary current in the base wireless power charging system 302a to reduce emissions in the space 520. In the wireless power transfer system 550, the magnet fields 225a and 525b are out of phase and combine to create a combined magnetic field 575 whose strength is reduced compared to each of the magnetic fields 225a and 225b and the combined magnetic field 530 of FIG. 5A.

Figure 6:
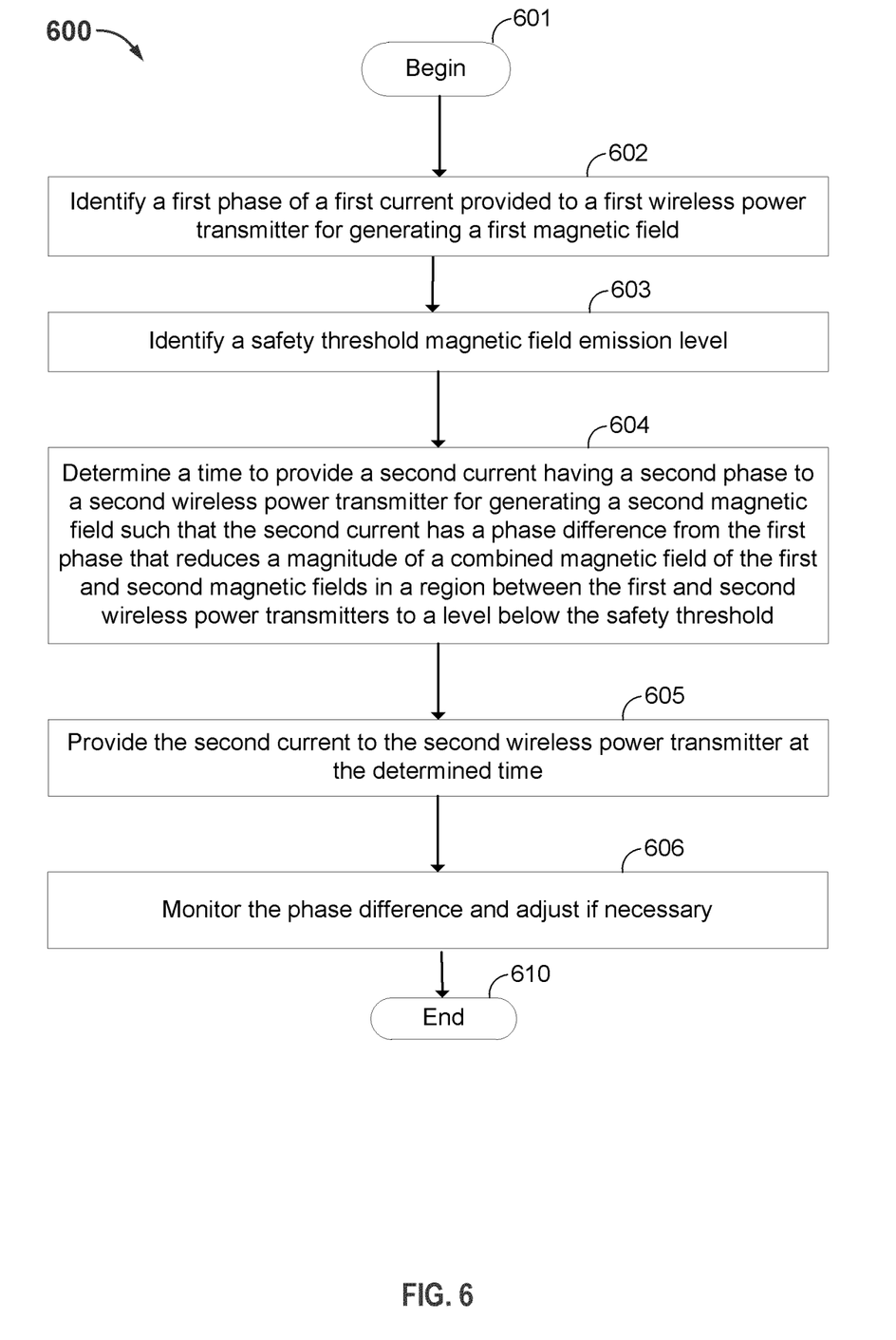
FIG. 6 is a flowchart of an exemplary method of an initial charging routine for finding an ideal operating frequency at a first or low power level, in accordance with another example implementation.

FIG. 6 is a flowchart depicting a method 600 for providing wireless power. The method shown in FIG. 6 may be implemented via one or more devices in the wireless power transfer systems 100, 200, 300, 400, 550 similar to the base wireless power charging systems 102, 202, 302, or the local distribution centers 130 or 430 of FIGS. 1-4. Although the method 600 is described herein with reference to a particular order, in various implementations, blocks herein may be performed in a different order, or omitted, and additional blocks may be added.

The method 600 begins at block 601 after a first wireless power transmitter (e.g., base wireless power charging system 102a) is activated and is providing wireless power to the electric vehicle 112a. At block 602, the local distribution center 130 identifies a first phase of a first current provided to the base wireless power charging system 102a for generating a first magnetic field (e.g., magnetic field 225a). In some embodiments, the local distribution center 130 provides the first current to the base wireless power charging system 102a through the power link 110. In some aspects, the first magnetic field 225a transfers power to the electric vehicle 112a. At block 603, the local distribution center 130 identifies a safety threshold magnetic field emission level. In some aspects, the safety threshold may be required by a standards organization and may be set to a level to avoid harmful effects to humans and/or objects. The local distribution center 130 may identify the safety threshold from a memory or it may be communicated to the local distribution center 130 by the electric vehicle 112a, the base wireless power charging system 102a, or another device.

At block 604, the local distribution center 130 determines a time to provide a second current having a second phase to a second wireless power transmitter (e.g., the base wireless power charging system 102b) for generating a second magnetic field such that the second phase has a phase difference from the first phase that reduces a magnitude of a combined magnetic field of the first and second magnetic fields in a region between the first and second wireless power transmitters to a level below the safety threshold. In some aspects, the local distribution center 130 determines the time based on a maximum phase difference from the first phase. For example, the local distribution center 130 may determine a time when the second phase has a 180 degree phase difference from the first phase. In some embodiments, such a phase difference may result in a 34% reduction in the combined magnetic field 475. In some aspects, the local distribution center 130 determines the time irrespectively of the safety threshold and only seeks to minimize the combined magnetic field 475. In some aspects, the local distribution center 130 may also base the determination on other wireless power transmitters operating in the vicinity or common area as the base wireless power charging systems 102a and 102b.

At block 605, the local distribution center 130 provides the second current to the base wireless power charging system 102b at the determined time. The second current generates the second magnetic field (e.g., magnetic field 425b) and, along with magnetic field 225a, creates the combined magnetic field 475. At block 606, the local distribution center 130 monitors the phase difference and/or the frequency difference between the base wireless charging systems 102a and 102b. In some aspects, thermal aspects, physical distance between the coils, and other time variant parameters may change at the base wireless charging systems 102a and 102b which may affect the combined magnetic field 475. In some embodiments, it may be necessary for the master controller 442 to monitor the phase difference and/or the frequency difference between the base wireless charging systems 102a and 102b for any changes and then adjust one or both of the first phase and second phase to account for those changes. In some aspects, the adjustments may be necessary to maintain the combined magnetic field 475 field strength below the safety threshold. At block 610, the method ends.

Embodiments described herein may be implemented in a variety of parking and/or charging arrangements. For example, the base wireless power charging systems 102a and 102b may be arranged side-by-side, front-to-front, vertical and/or horizontal offsets, or other arrangements. Additionally, while static wireless power transfer systems are shown in the examples, the embodiments described herein may also apply to dynamic or semi-dynamic wireless power transfer systems.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality may be implemented in varying ways for each particular application, but such implementation decisions should not be interpreted as causing a departure from the scope of the embodiments of the present disclosure.

The various illustrative blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm and functions described in connection with the embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art. A storage medium is coupled to the processor such that the processor can read information from, and write information to, the storage medium. In the alternative, the storage medium may be integral to the processor. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media. The processor and the storage medium may reside in an ASIC. For purposes of summarizing the disclosure, certain aspects, advantages and novel features of the present disclosure have been described herein. It is to be understood that not necessarily all such advantages may be achieved in accordance with any particular embodiment of the present disclosure. Thus, the present disclosure may be embodied or carried out in a manner that achieves or optimizes one advantage or group of advantages as taught herein without necessarily achieving other advantages as may be taught or suggested herein.

Various modifications of the above described embodiments will be readily apparent, and the generic principles defined herein may be applied to other embodiments without departing from the spirit or scope of the present disclosure. Thus, the present disclosure is not intended to be limited to the embodiments shown herein but is to be accorded the widest scope consistent with the principles and novel features disclosed herein.

What is claimed is:

1. An apparatus for providing wireless power to a plurality of devices, the apparatus comprising:
   a communication circuit configured to communicate with a first wireless power transmitter and a second wireless power transmitter; and
   a controller circuit, in communication with the first and second wireless power transmitters via the communication circuit, configured to:

identify a first frequency of a first current provided to the first wireless power transmitter, the first current generating a first magnetic field at a first level sufficient to power or charge a first device, determine a second frequency at which to provide a second current to the second wireless power transmitter such that a frequency difference between the first frequency and the second frequency reduces a magnitude of a combined magnetic field of the first and second magnetic fields in a region between the first and second wireless power transmitters, and provide the second current to the second wireless power transmitter at the second frequency.

2. The apparatus of claim 1, wherein the communication circuit is further configured to receive a measurement of the first current from the first wireless power transmitter.

3. The apparatus of claim 1, wherein the frequency difference is configured to reduce the magnitude of the combined magnetic field from a first level to a second level, the second level lower than the first level and satisfying a safety threshold magnetic field emissions level.

4. The apparatus of claim 1, wherein the controller circuit is further configured to provide the second current through a power transfer link.

5. The apparatus of claim 1, wherein the controller circuit is further configured to:

identify a first phase of the first current provided to the first wireless power transmitter;

determine a second phase with which to provide the second current to the second wireless power transmitter such that a phase difference between the first phase and the second phase reduces the combined magnetic field;

determine a time at which to provide the second current to the second wireless power transmitter; and provide the second current with the second phase to the second wireless power transmitter at the determined time.

6. The apparatus of claim 5, wherein the controller circuit is further configured to identify the first phase based on the measurement of the first current received from the first wireless power transmitter.

7. The apparatus of claim 5, further comprising a sensor circuit configured to measure the first phase and/or monitor a temperature of the first wireless power transmitter.

8. The apparatus of claim 1, wherein the controller circuit is further configured to determine a time to provide the second current to the second wireless power transmitter at the second frequency such that the magnitude of the combined magnetic field in the region is reduced.

9. A method for providing wireless power, the method comprising:

communicating with wireless power transmitter and a second wireless power transmitter;

identifying a first frequency of a first current provided to the first wireless power transmitter, the first current generating a first magnetic field at a first level sufficient to power or charge a first device;

determining a second frequency at which to provide a second current to the second wireless power transmitter such that a frequency difference between the first frequency and the second frequency reduces a magnitude of a combined magnetic field of the first and second magnetic fields in a region between the first and second wireless power transmitters; and providing the second current to the second wireless power transmitter at the second frequency.

10. The method of claim 9, further comprising receiving a measurement of the first current from the first wireless power transmitter.

11. The method of claim 9, wherein the frequency difference reduces the magnitude of the combined magnetic field from a first level to a second level, the second level lower than the first level and satisfying a safety threshold magnetic field emissions level.

12. The method of claim 9, wherein providing the second current comprises providing the second current through a power transfer link.

13. The method of claim 9, further comprising:

identifying a first phase of the first current provided to the first wireless power transmitter;

determining a second phase to provide the second current to the second wireless power transmitter such that a phase difference between the first and the second frequency reduces the combined magnetic field;

determining the time to provide the second current to the second wireless power transmitter; and providing the second current with the second phase to the second wireless power transmitter at the determined time.

14. The method of claim 13 wherein identifying the first phase is based on the measurement of the first current received from the first wireless power transmitter.

15. The method of claim 13, further comprising measuring the first phase and/or a temperature of the first wireless power transmitter via a sensor circuit.

16. The medium of claim 9, the method further comprising determining a time to provide the second current to the second wireless power transmitter such that the magnitude of the combined magnetic field in the region is reduced.

17. An apparatus for providing wireless power, the apparatus comprising:

means for communicating with wireless power transmitter and a second wireless power transmitter; and means for identifying a first frequency of a first current provided to the first wireless power transmitter, the first current generating a first magnetic field at a first level sufficient to power or charge a first device;

means for determining a second frequency at which to provide the second current to the second wireless power transmitter such that a frequency difference between the first frequency and the second frequency reduces a magnitude of a combined magnetic field of the first and second magnetic fields in a region between the first and second wireless power transmitters;

means for providing the second current to the second wireless power transmitter at the second frequency.

18. The apparatus of claim 17, further comprising means for receiving a measurement of the first current from the first wireless power transmitter.

19. The apparatus of claim 17, wherein the frequency difference reduces the magnitude of the combined magnetic field from a first level to a second level, the second level lower than the first level and satisfying a safety threshold magnetic field emissions level.

20. The apparatus of claim 17, wherein the means for communicating comprises a communication circuit, means for identifying comprises a controller circuit, means for determining comprises a controller circuit, and means for providing comprises a controller circuit.

21. The apparatus of claim 17, further comprising:

means for identifying a first phase of the first current provided to the first wireless power transmitter;

means for determining a second phase to provide the second current to the second wireless power transmitter such that a phase difference between the first phase and the second phase reduces the combined magnetic field;
means for determining the time to provide the second current to the second wireless power transmitter; and
means for providing the second current at the second phase to the second wireless power transmitter at the determined time.

22. The apparatus of claim 21, wherein the means for identifying the first phase is based on the measurement of the first current received from the first wireless power transmitter.

23. The apparatus of claim 21, further comprising means for measuring the first phase.

24. The apparatus of claim 17, further comprising means for determining a time to provide the second current to the second wireless power transmitter such that the magnitude of the combined magnetic field in the region is reduced.

25. A non-transitory computer readable storage medium comprising instructions that when executed cause a processor to perform a method for wirelessly transmitting power, comprising:
communicating with wireless power transmitter and a second wireless power transmitter;
identifying a first phase of a first current provided to the first wireless power transmitter, the first current generating a first magnetic field at a first level sufficient to power or charge a first device;
determining a second frequency at which to provide a second current to the second wireless power transmitter such that a frequency difference between the first frequency and the second frequency reduces a magnitude of a combined magnetic field of the first and second magnetic fields in a region between the first and second wireless power transmitters;
providing the second current to the second wireless power transmitter at the second frequency; and
monitoring temperature of the first wireless power transmitter.

26. The medium of claim 25, the method further comprising receiving a measurement of the first current from the first wireless power transmitter.

27. The medium of claim 25, wherein the frequency difference reduces the magnitude of the combined magnetic field from a first level to a second level, the second level lower than the first level and satisfying a safety threshold magnetic field emissions level.

28. The medium of claim 25, the method further comprising:
identifying a first phase of the first current provided to the first wireless power transmitter;
determining a second phase to provide the second current to the second wireless power transmitter such that a phase difference between the first phase and the second phase reduces the combined magnetic field;
determining the time to provide the second current to the second wireless power transmitter; and
providing the second current with the second phase to the second wireless power transmitter at the determined time.

29. The medium of claim 28, wherein identifying the first phase is based on the measurement of the first current received from the first wireless power transmitter.

30. The medium of claim 28, the method further comprising measuring the first phase and/or a temperature of the first wireless power transmitter via a sensor circuit.

* * * * *